(12) United States Patent
Maron

(10) Patent No.: US 7,757,216 B2
(45) Date of Patent: Jul. 13, 2010

(54) APPLICATION SERVER PERFORMANCE TUNING CLIENT INTERFACE

(75) Inventor: Jonathan Maron, Marlton, NJ (US)

(73) Assignee: Orcle International Corporation, Red Shores, CA (US)

( * ) Notice: Subject to any disclaimer, the term of this patent is extended or adjusted under 35 U.S.C. 154(b) by 1532 days.

(21) Appl. No.: 10/730,897

(22) Filed: Dec. 10, 2003

(65) Prior Publication Data
US 2005/0144267 A1 Jun. 30, 2005

(51) Int. Cl.
G06F 9/44 (2006.01)
G06F 9/45 (2006.01)
G06F 15/173 (2006.01)

(52) U.S. Cl. ............ 717/127; 717/130; 717/121; 717/151; 717/125; 717/131; 709/223; 709/224

(58) Field of Classification Search ............ 717/113, 717/121, 130
See application file for complete search history.

(56) References Cited

U.S. PATENT DOCUMENTS

| | | | | |
|---|---|---|---|---|
| 6,252,592 B1 * | 6/2001 | King et al. | | 715/764 |
| 6,725,229 B2 * | 4/2004 | Majewski et al. | | 707/102 |
| RE38,865 E * | 11/2005 | Dumarot et al. | | 717/153 |
| 7,107,285 B2 * | 9/2006 | von Kaenel et al. | | 707/104.1 |
| 7,133,907 B2 * | 11/2006 | Carlson et al. | | 709/220 |
| 7,171,458 B2 * | 1/2007 | Brown et al. | | 709/220 |
| 7,216,298 B1 * | 5/2007 | Ballard et al. | | 715/760 |
| 7,219,300 B2 * | 5/2007 | Arquie et al. | | 715/736 |
| 7,263,662 B1 * | 8/2007 | Ballard et al. | | 715/762 |
| 7,512,888 B2 * | 3/2009 | Sugino et al. | | 715/734 |
| 2003/0229695 A1 * | 12/2003 | Mc Bride | | 709/224 |
| 2004/0148585 A1 * | 7/2004 | Sengodan | | 717/101 |
| 2004/0181794 A1 * | 9/2004 | Coleman et al. | | 718/104 |
| 2005/0015730 A1 * | 1/2005 | Gunturi et al. | | 715/777 |

* cited by examiner

Primary Examiner—Insun Kang
(74) Attorney, Agent, or Firm—Hanify & King

(57) ABSTRACT

An application tuning tool, and method, system, and computer program product for application tuning, provides application deployers with a single, unified facility for modifying the relevant parameters to achieve optimal performance, which makes the application tuning process simpler and easier, so that it can be performed by less skilled individuals and yet be performed more quickly by those less skilled individuals. A method of tuning an application deployed in an application server comprises the steps of deploying the application in the application server, invoking an application tuning tool operable to display information relating to application parameters to be tuned, receiving specifications of values of application tuning parameters, and tuning the application using the received specified parameter values.

36 Claims, 5 Drawing Sheets

APPLICATION SERVER PERFORMANCE TUNING CLIENT INTERFACE

FIELD OF THE INVENTION

The present invention relates to an interface and a method, system, and computer program product for performance tuning of parameters of applications deployed to an application server.

BACKGROUND OF THE INVENTION

When developers deploy applications to an application server they are hoping to leverage the various facilities of the environment to achieve the best application performance. This application performance is typically measured in terms of response time, transactions per second, throughput, etc. The application server vendors, in turn, do their best to optimize their servers to provide the best performance possible out of the box.

Performance tuning of applications running in an application server may potentially involve the modification of multiple configuration parameters such as thread pool size, connection pool size, transaction timeout period, various Java Virtual Machine (JVM) parameters, and component configuration items.

However, each application deployed to an application server has its own unique characteristics. For example, the mixture of web based components, Enterprise JavaBeans (EJBs), and back-end resources, and the manner in which these components are accessed, can have dramatic effects on the system's performance. Therefore, each application deployment requires a tuning phase on a staging platform in order to find the optimum settings for various platform parameters, such as the Java Virtual machine parameters, the application server configuration settings, etc., as well as some application dependent settings. This phase may involve the use of third party tools, which may be very expensive, and multiple application restarts, which prolong the process. In addition, multiple software tools such as web load generators etc. are generally required to perform these operations. This performance tuning process is currently the domain of engineers with expertise in the deployed application, the application server, networking, and hardware. All of this results in an application tuning process that is expensive and time consuming. A need arises for an technique by which the application tuning process can be made simpler and easier, so that it can be performed by less skilled individuals and yet be performed more quickly by those less skilled individuals.

SUMMARY OF THE INVENTION

The present invention provides application deployers with a single, unified client-side facility for modifying the relevant parameters to achieve optimal performance. This makes the application tuning process simpler and easier, so that it can be performed by less skilled individuals and yet be performed more quickly by those less skilled individuals. This is achieved by deploying a server-side component, such as a Java Management Extensions (JMX) Mbean, that manages all performance relevant system settings and shows all the pertinent performance metrics. The deployed component will act as a wrapper to multiple manageable resources and will instrument the pertinent performance metrics in the application server. Thus, an application deployer will be able to modify parameters such as thread pool size, database connection pool size, etc., and see the effect on system performance in real time via a client interface to the server-side component.

In one embodiment of the present invention, an application tuning tool operable to tune an application deployed in an application server comprises an interface including displays of current values of application parameters and measurements of performance of the application, wherein the interface displays emphasize importance of a particular parameter over another parameter, software operable to receive specifications of values of application tuning parameters, and software operable to tune the application using the received specified parameter values.

In one aspect of the present invention, the application tuning tool may be invoked in response to an action by an administrator, engineer, or user of the application server.

In one aspect of the present invention, the interface comprises a first portion operable to display the current values of application parameters and a second portion operable to display the measurements of performance of the application. The first portion operable to display the current values of application parameters may be further operable to accept input from the administrator, engineer, or user to specify values of the application parameters. The values of application parameters may comprise at least one of Database Connection Pool size, Thread Pool Size, HTTP connection pool size, HTTP incoming connection queue length, HTTP Socket timeout, Session pool size, and Java Virtual Machine tuning parameters. The measurements of performance of the application may comprise at least one of Overall transactions per second, Average Request Time, HTTP transactions per second, Database connections used, HTTP connections used, Active thread count, Overall throughput, Database throughput, HTTP throughput.

In one aspect of the present invention, the interface comprises a plurality of tabs, each tab operable to display information relating to a type of parameters represented by the tab. The interface may further comprise a first portion operable to display the current values of application parameters represented by a selected tab and a second portion operable to display the measurements of performance of the application. The first portion operable to display the current values of application parameters represented by a selected tab may be further operable to accept input from the administrator, engineer, or user to specify values of the application parameters. The values of application parameters may comprise at least one of Database Connection Pool size, Thread Pool Size, HTTP connection pool size, HTTP incoming connection queue length, HTTP Socket timeout, Session pool size, and Java Virtual Machine tuning parameters. The measurements of performance of the application may comprise at least one of Overall transactions per second, Average Request Time, HTTP transactions per second, Database connections used, HTTP connections used, Active thread count, Overall throughput, Database throughput, HTTP throughput.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides application deployers with a single, unified facility for modifying the relevant parameters to achieve optimal performance. This makes the application tuning process simpler and easier, so that it can be performed by less skilled individuals and yet be performed more quickly by those less skilled individuals. This is achieved by deploying a server-side component, such as a Java Management Extensions (JMX) Mbean, that manages all performance relevant system settings and shows all the pertinent performance metrics. The deployed component will act as a wrapper to multiple manageable resources and will instrument the pertinent performance metrics in the application server. Thus, an application deployer will be able to modify parameters via a client interface to the server-side component such as thread pool size, database connection pool size, etc., and see the effect on system performance in real time.

In a preferred embodiment, the server-side component is implemented as a JMX Mbean. Java Management Extensions (JMX) is a Java standard that defines a management architecture, APIs, and management services. JMX also defines manageable resources and associated management beans, or MBeans, that provide instrumentation of these managed resources in a standardized way. Further, since JMX is a standardized mechanism, existing management tools that are JMX compliant are able to remotely manage resources via the MBeans registered with a JMX agent (generally running in the server). In fact, there is an evolving standard for remote JMX access.

Thus, the present invention provides advantages such as:

The task of performance tuning will become much easier since all the relevant information and values are available in one interface.

There will be little or no need for 3rd party performance tuning tools.

Performance fine tuning could now be done on production systems since the performance MBean is part of the application server.

Access to the performance tuning facility could be achieved through any JMX compliant management tool.

Figure 1:
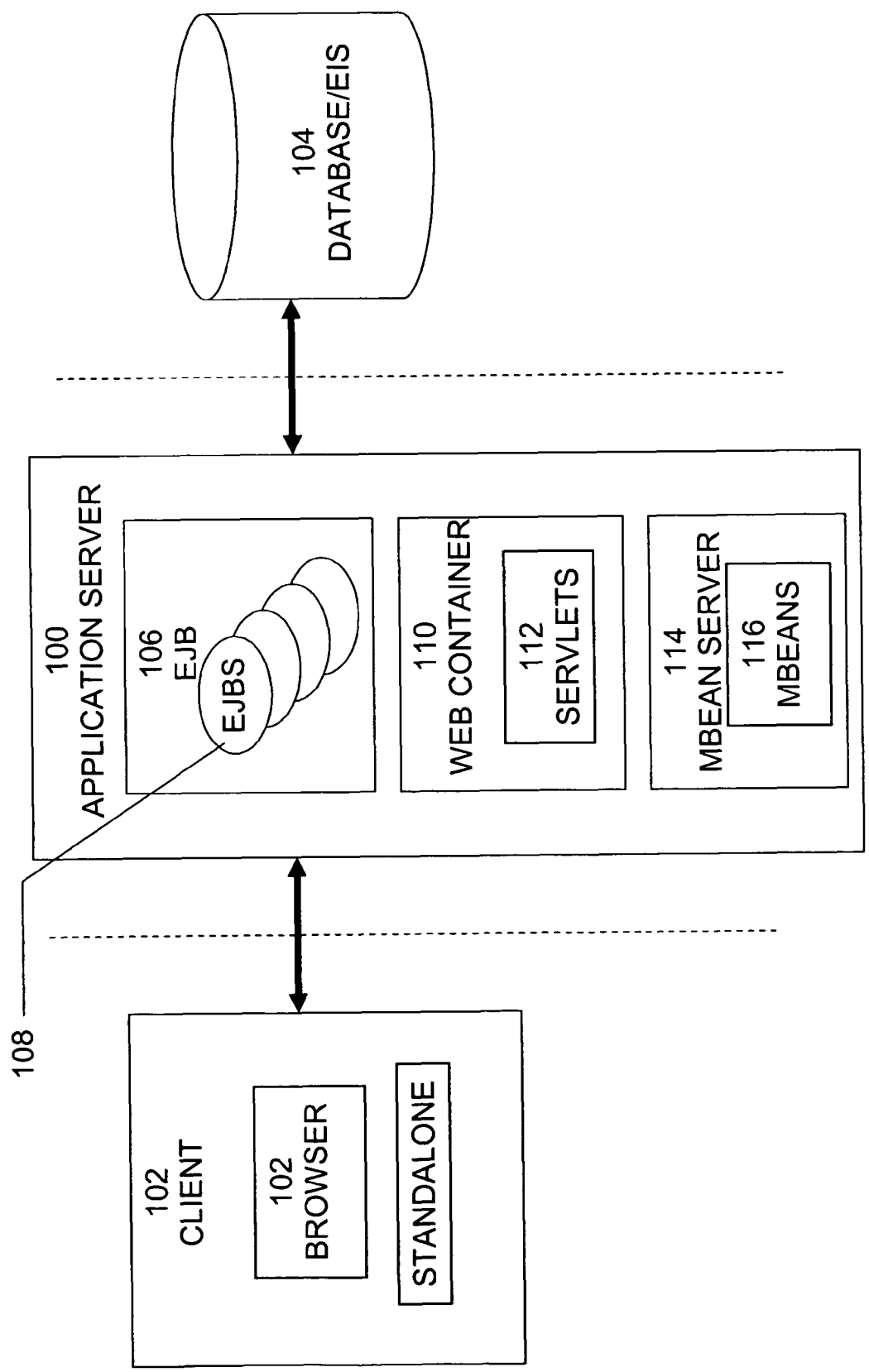
FIG. 1 is an exemplary block diagram of an application server, in which the present invention may be implemented.

An exemplary block diagram of an application server 100, in which the present invention may be implemented, is shown in FIG. 1. The exemplary application server shown in FIG. 1 is based on the well-known ORACLE® application server. However, this application server is merely an example. The present invention is applicable to other application servers as well, such as those from IBM®, MICROSOFT®, etc.

An Application Server generally interacts with both clients 102 and back-end EIS systems 104. The application server provides an Enterprise Java Bean (EJB) container 106 to facilitate access to EIS and/or database systems 104. A container is a controlled run-time environment for an application component (e.g., an EJB 108) that also provides an interface to components executing within the container. Also, containers provide basic management functionality such as life cycle management of the components, security, deployment, threading, etc. An EJB 108 is a software component that implements the interfaces defined by its respective container. The interfaces of the EJB 108 are defined in a manner that permits the functionality of the respective EJB 108 to be accessed in a modular and dynamic manner.

The application server 100 also provides a Web container 110. The Web container 110 may provide a controlled run-time environment for components that interact with a client. For example, servlet components 112 (persistent Web server processes that are capable of processing multiple requests) may be implemented to dynamically create hypertext markup language (HTML) or XML responses to requests from clients. Other suitable components may be implemented within the Web container.

In general, the middle tier may be implemented utilizing "middleware servers" or "application servers." An application server typically includes many dissimilar services that are appropriate to create a stable and robust environment for enterprise applications. A service represents a predefined task that is provided by a piece of software in a well defined and predicable manner. Typically, an application server may comprise services that implement management functionality, such as MBean server 114, in which management services may be implemented as MBeans 116. The management services of the application server may be responsible for starting, registering, monitoring, and stopping services. Management services may perform other tasks such as thread pooling, security management, state management, class loading, load-balancing, dynamic application launching, and/or the like. Secondly, an application server may provide a basic set of services that may be commonly utilized by a wide range of enterprise applications (e.g., hypertext transfer protocol (HTTP) processing). Third, an application server may comprise application specific services that implement the business or other logic of a given enterprise application.

Tuning Tool

The present invention provides application deployers with a single, unified facility for modifying the relevant parameters to achieve optimal performance. This makes the application tuning process simpler and easier, so that it can be performed by less skilled individuals and yet be performed more quickly by those less skilled individuals. This is achieved by deploying a server-side component, such as a Java Management Extensions (JMX) Mbean, that manages all performance relevant system settings and shows all the pertinent performance metrics. The deployed server-side component will act as a wrapper to multiple manageable resources and will instrument the pertinent performance metrics in the application server. Thus, an application deployer will be able to modify parameters such as thread pool size, database connection pool size, etc., and see the effect on system performance in real time.

In a preferred embodiment, the server-side component is implemented as a JMX Mbean. Java Management Extensions (JMX) is a Java standard that defines a management architecture, APIs, and management services. JMX also defines manageable resources and associated management beans, or MBeans, that provide instrumentation of these managed resources in a standardize6d way. Further, since JMX is a standardized mechanism, existing management tools that are JMX compliant are able to remotely manage resources via the MBeans registered with a JMX agent (generally running in the server). In fact, there is an evolving standard for remote JMX access.

Preferably, the software tool includes an interface that provides a unified view of all performance tuning configuration items as well as the statistics required to ascertain the utility of various modifications. This view can also be structured to reflect the performance tuning methodology proposed by the application server vendor. The interface would allow an administrator to modify key parameters such as thread pool size, database connection pool size, HTTP connection parameters, etc. The interface may be implemented as a web-based interface or otherwise.

This interface provides a unified and coherent view of the performance tuning parameters available to an application deployer and would thus eliminate the requirement for a great deal of performance tuning expertise on the part of the deployer. In addition, the availability of such an interface would allow the tuning of a live, deployed application—an application management task currently limited to staging servers that may not accurately reflect deployment conditions. Finally, this interface can be structured such that a deployer has a clear view of the performance tuning process favored by the application server vendor.

Figure 2:
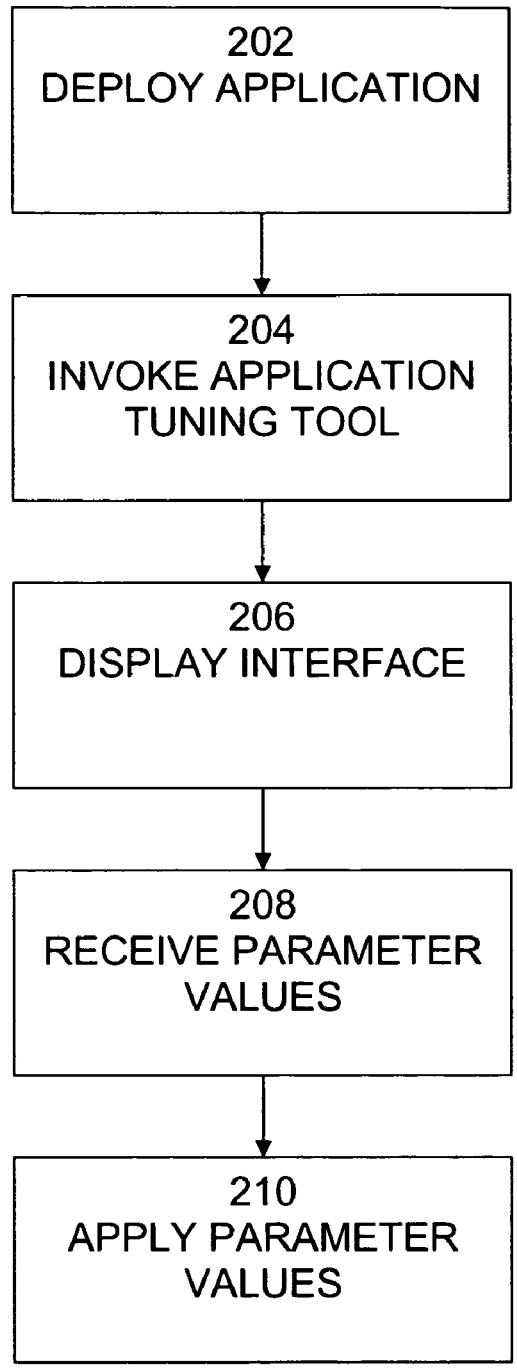
FIG. 2 is an exemplary flow diagram of a process 200 for application tuning according to the present invention.

An exemplary flow diagram of a process 200 for tuning an application deployed in an application server, according to the present invention, is shown in FIG. 2. Process 200 begins with step 202, in which the application is deployed to the application server. The application server may be an offline or simulated application server, which allows tuning of the application before operational deployment of the application, or the application server may be an operational application server that is providing service to users.

In step 204, an administrator, engineer, or user of the application server invokes an application tuning tool. The application tuning tool is a software tool that provides the capability to tune the parameters of the application. The application tuning tool is operable to display information relating to application parameters to be tuned. Such information may include the current values of application parameters and measurements of the performance of the application.

In step 206, an interface is displayed by the application tuning tool to the administrator, engineer, or user who is performing the application tuning. The interface includes displays of current values of application parameters and measurements of the performance of the application, as well as the capability to accept input from the administrator, engineer, or user of specifications of application tuning parameters, which may be used to modify the values of the application parameters.

In step 208, the application tuning tool receives specifications of application tuning parameters, which typically are modifications to the values of the application parameters. This is done by the administrator, engineer, or user using the interface to enter the specifications of application tuning parameters In step 210, the received parameter values are applied to the application.

Figure 3:
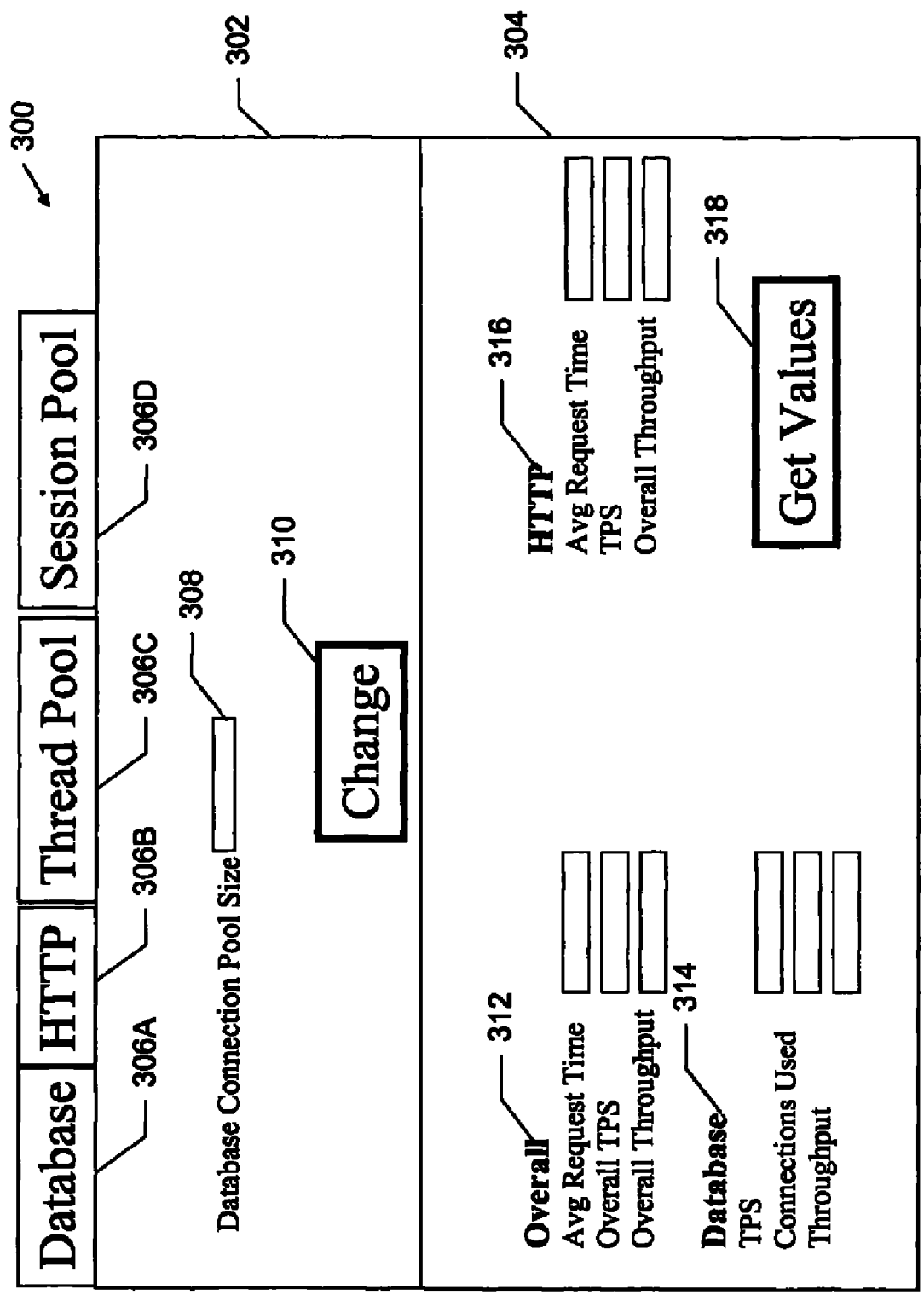
FIG. 3 is an exemplary illustration of an interface that may be provided by the present invention.

An exemplary illustration of an interface 300 that may be provided by the present invention is shown in FIG. 3. Interface 300 is created as part of the application tuning tool that provides a developer or system administrator with a unified view of all performance tuning parameters as well as the performance measurements required to ascertain the utility of various modifications. This view can also be structured to reflect the performance tuning methodology proposed by the application server vendor. The interface would allow an administrator to modify key parameters such as thread pool size, database connection pool size, HTTP connection parameters, etc.

Interface 300 provides a unified and coherent view of the performance tuning parameters available to an application deployer and would thus eliminate the requirement for a great deal of performance tuning expertise on the part of the deployer. In addition, the availability of such an interface would allow the tuning of a live, deployed application—an application management task currently limited to staging servers that may accurately reflect deployment conditions. Finally, this interface can be structured such that a deployer has a clear view of the performance tuning process favored by the application server vendor.

In the example shown in FIG. 3, interface 300 includes a plurality of data selection tabs, such as tabs 306A-D. Each tab represents a type of application and/or application server parameters that are to be tuned. Selection of a tab caused interface 300 to display information relating to the type of parameters represented by the tab, such as the current values of the parameters, in a parameter panel 302. Performance measurements may also be displayed in a measurement panel 304. For example, selecting database tab 306A causes display of parameters related to the database, such as database connection pool size 308, in parameter panel 302. In addition, parameter panel 302 includes controls that allow the values of the displayed parameters to be modified, such as change button 310.

Performance measurements affected by the values of the displayed parameters may also be displayed in measurement panel 304. For example, overall performance 312, database performance 314 and HTTP performance 316 may be displayed. In addition, measurement panel 304 may include controls that allow the values of the displayed measurements to be determined, such as get values button 318. In some embodiments, the displayed measurements may be determined continuously or periodically, while in other embodiments, especially those in which determination of the measurements takes a significant length of time or uses significant resources, the measurements are only determined when requested.

The order of the tabs 306A-D may be arranged so as to emphasize the importance of particular types of parameters over other. In the example shown in FIG. 3, the database connection pool size is emphasized over other parameters. In this example, the HTTP values would be next in importance, etc. The measurement panel 304 would stay in place so that at any given time the user could obtain the up to date values to ascertain whether his modifications are improving application performance.

Examples of parameters that may be useful to tune include, but are not limited to:
1) Database Connection Pool size
2) Thread Pool Size
3) HTTP connection pool size (HTTP 1.1)
4) HTTP incoming connection queue length
5) HTTP Socket timeout
6) Various object pools sizes (vendor dependent) such as session pool size.
7) Java Virtual Machine tuning parameters (command line attributes) though these would require a server restart to take effect. These include memory size, socket timeout periods, etc. Therefore, access to the "restart" facility of the server would also be a nice feature to have.

Figure 4:
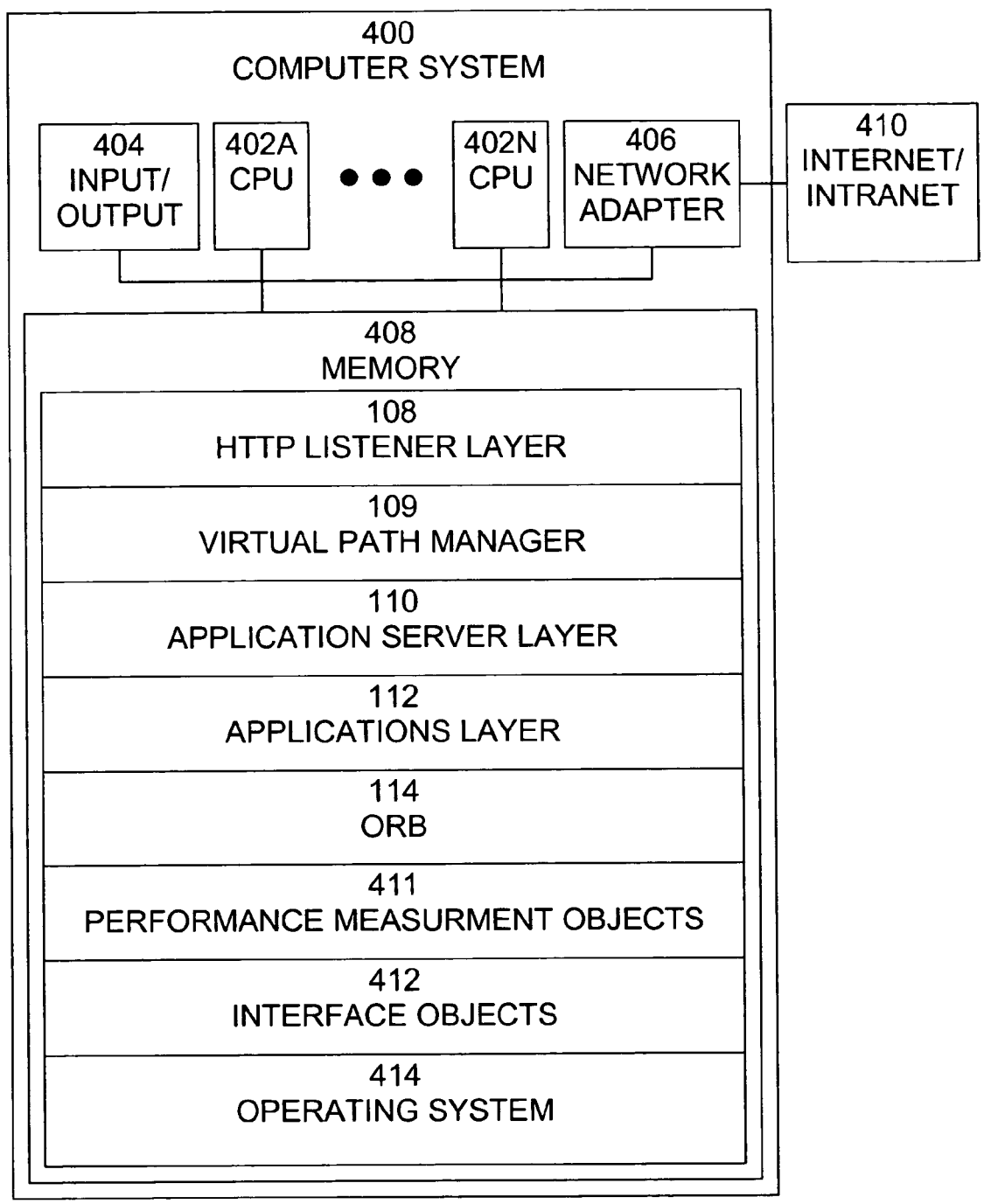
FIG. 4 is an exemplary block diagram of a computer system, in which an application server, such as that shown in FIG. 1, may be implemented.

Examples of performance measurement that may be useful to display include, but are not limited to:
1) Overall transactions per second
2) Average Request Time
3) HTTP transactions per second
4) Database connections used
5) HTTP connections used
6) Active thread count
7) Overall throughput
8) Database throughput
9) HTTP throughput An exemplary block diagram of a computer system 400, in which an application server, such as that shown in FIG. 1, may be implemented, is shown in FIG. 4. System 400 is typically a programmed general-purpose computer system, such as a personal computer, workstation, server system, and minicomputer or mainframe computer. System 400 includes one or more processors (CPUs) 402A-402N, input/output circuitry 404, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which system 400 is implemented as a single multiprocessor computer system, in which multiple processors 402A-402N share system resources, such as memory 408, input/output circuitry 404, and network adapter 406. However, the present invention also contemplates embodiments in which system 400 is implemented as a plurality of networked computer systems, which may be single-processor computer systems, multi-processor computer systems, or a mix thereof.

Input/output circuitry 404 provides the capability to input data to, or output data from, database/System 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/System 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of system 400. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 4, memory 408 includes HTTP listener layer 108, virtual path manager 109, application server layer 110, applications layer 112, ORB 114, performance measurement objects 411, interface objects 412, and operating system 414. HTTP listener layer 108 is made up of listeners, the adapter interface, and dispatchers. Listeners are HTTP servers; they handle incoming requests and route them to the dispatcher. The dispatcher forwards requests to the virtual path manager 109. The virtual path manager maps a request to a cartridge type and passes this information back to the dispatcher. The virtual path manager also passes back authentication requirements to the dispatcher. The Application Server layer 110 provides resource management in handling requests for applications deployed as cartridges on the server. It provides a common set of components for managing these applications. These components include load balancing, logging, automatic failure recovery, security, directory, and transaction components. The Applications layer 112 is made up of applications, cartridges, and cartridge servers. Applications and cartridges are the two main objects that you use when building applications for the application server environment. ORB 114 acts as the middleware between clients and servers. Performance measurement objects 411 determine the values of performance measurements related to application tuning. Interface objects 412 implement the interface shown in FIG. 3. Operating system 414 provides overall system functionality.

As shown in FIG. 4, the present invention contemplates implementation on a system or systems that provide multiprocessor, multi-tasking, multi-process, and/or multi-thread computing, as well as implementation on systems that provide only single processor, single thread computing. Multiprocessor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Preferably, the server-side component of the present invention is implemented using Java Management Extensions (JMX). JMX technology represents a universal, open technology for management, and monitoring that can be deployed wherever management and monitoring are needed. By design, this standard is suitable for adapting legacy systems, implementing new management and monitoring solutions and plugging into those of the future.

JMX technology is the definitive means for Java management and monitoring: JMX technology provides the tools for building distributed, Web-based, modular and dynamic solutions for managing and monitoring devices, applications and serviced-driven networks.

The JMX defines an architecture, the design patterns, the APIs, and the services for application and network management and monitoring in the Java programming language. The JMX specification provides Java developers across all industries with the means to instrument Java code, create smart Java agents, implement distributed management middleware and managers, and smoothly integrate these solutions into existing management and monitoring systems. In addition, the JMX specification is referenced by a number of Java APIs 524, shown in FIG. 5, for existing standard management and monitoring technologies. It should be noted that, throughout the rest of the present document, the concept of management refers to both management and monitoring services.

Figure 5:
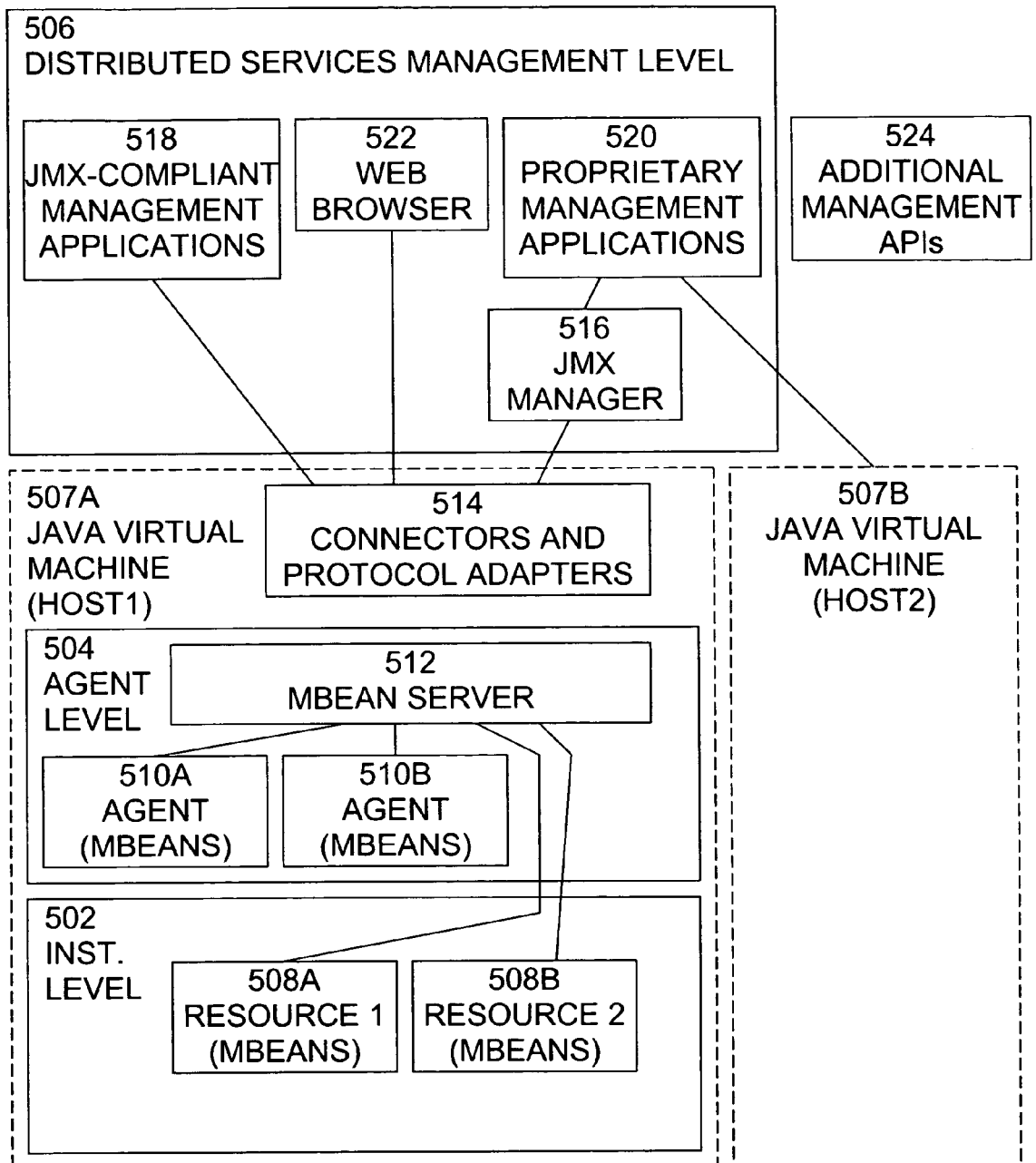
FIG. 5 is an exemplary architecture of a JMX architecture that may be used to implement the present invention.

FIG. 5 shows how the key components of the JMX architecture 500 relate to one another within the three levels of the architectural model. The JMX architecture is divided into three levels:

Instrumentation level 502
Agent level 504
Distributed Services Management Level 506

Instrumentation level 502 and agent level 504 are implemented within or in conjunction with a Java virtual machine, such as Java virtual machines 507A-B.

Instrumentation Level

The instrumentation level 502 provides a specification for implementing JMX manageable resources, such as resources 508A-B. A JMX manageable resource can be an application, an implementation of a service, a device, a user, and so forth. It is developed in Java, or at least offers a Java wrapper, and has been instrumented so that it can be managed by JMX-compliant applications. The instrumentation of a given resource is provided by one or more Managed Beans, or MBeans, that are either standard or dynamic. Standard MBeans are Java objects that conform to certain design patterns derived from the JavaBeans™ component model. Dynamic MBeans conform to a specific interface that offers more flexibility at runtime.

The instrumentation of a resource allows it to be manageable through the agent level described in the next section. MBeans do not require knowledge of the JMX agent with that they operate. MBeans are designed to be flexible, simple, and easy to implement. Developers of applications, services, or devices can make their products manageable in a standard way without having to understand or invest in complex management systems. Existing objects can easily be evolved to produce standard MBeans or wrapped as dynamic MBeans, thus making existing resources manageable with minimum effort.

In addition, the instrumentation level also specifies a notification mechanism. This allows MBeans to generate and propagate notification events to components of the other levels. Because the instrumentation level consists of design patterns and Java interfaces, the reference implementation can only provide an example of the different MBeans and of their notification mechanism. However, the compatibility test suite for the instrumentation level will check that MBeans being tested conform to the design patterns and implement the interfaces correctly. JMX manageable resources are automatically manageable by agents compliant with the JMX specification. They can also be managed by any system that is not compliant with the JMX specification that supports the MBean design patterns and interfaces.

Agent Level

The agent level 504 provides a specification for implementing agents, such as agents 510A-B. Management agents directly control the resources and make them available to remote management applications. Agents are usually located on the same machine as the resources they control, although this is not a requirement. This level builds upon and makes use of the instrumentation level, to define a standardized agent to manage JMX manageable resources. The JMX agent level 504 consists of an MBean server 512 and a set of service agents, such as 510A-B, for handling MBeans. In addition, a JMX agent will need at least one communications adapter or connector 514. The MBean server implementation and the agent services are mandatory in an implementation of the specification.

The JMX agent can be embedded in the machine that hosts the JMX manageable resources when a Java Virtual Machine (JVM) is available in that machine. Likewise, the JMX agent can be instantiated into a mediation/concentrator element when the managed resource only offers a proprietary (non-Java) environment. Otherwise, a JMX agent does not need to know which resources it will serve: any JMX manageable resource can use any JMX agent that offers the services it requires.

Managers access an agent's MBeans and use the provided services through a protocol adapter or connector, as described in the next section. However, JMX agents do not require knowledge of the remote management applications that use them. JMX agents are implemented by developers of management systems, who can build their products in a standard way without having to understand the semantics of the JMX manageable resources, or the functions of the management applications. The reference implementation of the JMX agent is a set of Java classes that provide an MBean server and all the agent services. The agent compatibility test suite will check that agents being tested conform to the interfaces and functionality set forth in the agent specification. Agents that have been successfully tested against the agent CTS are qualified as JMX agents.

JMX agents run on the Java 2 Platform, Standard Edition (the J2SE™ platform) version 1.3 or above, and on certain profiles of the Java 2 Platform, Micro Edition (the J2ME™ platform). JMX agents will be automatically compatible with JMX distributed services, and can also be used by any non-JMX compliant systems or applications that support JMX agents.

Distributed Services Management Level

The Distributed Services Management Level 506 provides the interfaces for implementing JMX managers 516, and also includes web browser 522. This level defines management interfaces and components that can operate on agents or hierarchies of agents. These components can:

Provide an interface for management applications 518 and 520 to interact transparently with an agent and its JMX manageable resources through a connector Expose a management view of a JMX agent and its MBeans by mapping their semantic meaning into the constructs of a data-rich protocol (for example the hypertext mark-up language (HTML) or the simple network management protocol (SNMP))

Distribute management information from high-level management platforms to numerous JMX agents Consolidate management information coming from numerous JMX agents into logical views that are relevant to the end user's business operations Provide security Management components cooperate with one another across the network to provide distributed, scalable management functions. Customized Java-based management functions can be developed on top of these components to deploy a management application. The combination of the manager level with the other agent and instrumentation levels provides a complete architecture for designing and developing complete management solutions. The Java Management extensions technology brings unique facilities to such solutions, such as portability, on-demand deployment of management functionality, dynamic and mobility services, and security.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CDROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of tuning an application deployed in an application server, comprising the steps of:
deploying the application in the application server;
invoking an application tuning tool to display an interface including displays of current values of application parameters and measurements of performance of the application, wherein the interface displays emphasize importance of a particular parameter over another parameter, wherein the interface comprises a first portion operable to display the current values of application parameters, and a second portion operable to display the measurements of performance of the application, wherein when the first portion changes to display values of different application parameters, the second portion continues to display the measurements of performance of the application;
receiving specifications of values of application tuning parameters; and
tuning the application using the received specified parameter values.

2. The method of claim 1, wherein the step of invoking the application tuning tool is performed in response to an action by an administrator, engineer, or user of the application server.

3. The method of claim 2, wherein the first portion operable to display the current values of application parameters is further operable to accept input from the administrator, engineer, or user to specify values of the application parameters.

4. The method of claim 3, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

5. The method of claim 4, wherein the measurements of performance of the application comprise at least one of Overall transactions per second, Average Request Time, HTTP transactions per second, Database connections used, HTTP connections used, Active thread count, Overall throughput, Database throughput, HTTP throughput.

6. The method of claim 2, wherein the interface comprises:
a plurality of tabs, each tab operable to display information relating to a type of parameters represented by the tab.

7. The method of claim 6, wherein the first portion operable to display the current values of application parameters represented by a selected tab is further operable to accept input from the administrator, engineer, or user to specify values of the application parameters.

8. The method of claim 7, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

9. The method of claim 8, wherein the measurements of performance of the application comprise at least one of:
Overall transactions per second, Average Request Time, HTTP transactions per second, Database connections used, HTTP connections used, Active thread count, Overall throughput, Database throughput, HTTP throughput.

10. A system for tuning an application deployed in an application server comprising:
a processor operable to execute computer program instructions;
a memory operable to store computer program instructions executable by the processor; and
computer program instructions stored in the memory and executable to perform the steps of:
deploying the application in the application server;
invoking an application tuning tool to display an interface including displays of current values of application parameters and measurements of performance of the application, wherein the interface displays emphasize importance of a particular parameter over another parameter, wherein the interface comprises a first portion operable to display the current values of application parameters, and a second portion operable to display the measurements of performance of the application, wherein when the first portion changes to display values of different application parameters, the second portion continues to display the measurements of performance of the application;
receiving specifications of values of application tuning parameters; and
tuning the application using the received specified parameter values.

11. The system of claim 10, wherein the step of invoking the application tuning tool is performed in response to an action by an administrator, engineer, or user of the application server.

12. The system of claim 11, wherein the first portion operable to display the current values of application parameters is further operable to accept input from the administrator, engineer, or user to specify values of the application parameters.

13. The system of claim 12, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

14. The system of claim 13, wherein the measurements of performance of the application comprise at least one of:
Overall transactions per second, Average Request Time, HTTP transactions per second, Database connections used, HTTP connections used, Active thread count, Overall throughput, Database throughput, HTTP throughput.

15. The system of claim 11, wherein the interface comprises:
a plurality of tabs, each tab operable to display information relating to a type of parameters represented by the tab.

16. The system of claim 15, wherein the first portion operable to display the current values of application parameters represented by a selected tab is further operable to accept input from the administrator, engineer, or user to specify values of the application parameters.

17. The system of claim 16, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

18. The system of claim 17, wherein the measurements of performance of the application comprise at least one of:
Overall transactions per second, Average Request Time, HTTP transactions per second, Database connections used, HTTP connections used, Active thread count, Overall throughput, Database throughput, HTTP throughput.

19. A computer program product for tuning an application deployed in an application server comprising:

a computer readable recordable-type medium;
computer program instructions, recorded on the computer readable recordable-type medium, executable by a processor, for performing the steps of deploying the application in the application server;
invoking an application tuning tool to display an interface including displays of current values of application parameters and measurements of performance of the application, wherein the interface displays emphasize importance of a particular parameter over another parameter, wherein the interface comprises a first portion operable to display the current values of application parameters, and a second portion operable to display the measurements of performance of the application, wherein when the first portion changes to display values of different application parameters, the second portion continues to display the measurements of performance of the application;
receiving specifications of values of application tuning parameters; and
tuning the application using the received specified parameter values.

20. The computer program product of claim 19, wherein the step of invoking the application tuning tool is performed in response to an action by an administrator, engineer, or user of the application server.

21. The computer program product of claim 20, wherein the first portion operable to display the current values of application parameters is further operable to accept input from the administrator, engineer, or user to specify values of the application parameters.

22. The computer program product of claim 21, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

23. The computer program product of claim 22, wherein the measurements of performance of the application comprise at least one of Overall transactions per second, Average Request Time, HTTP transactions per second, Database connections used, HTTP connections used, Active thread count, Overall throughput, Database throughput, HTTP throughput.

24. The computer program product of claim 20, wherein the interface comprises:
a plurality of tabs, each tab operable to display information relating to a type of parameters represented by the tab.

25. The computer program product of claim 24, wherein the first portion operable to display the current values of application parameters represented by a selected tab is further operable to accept input from the administrator, engineer, or user to specify values of the application parameters.

26. The computer program product of claim 25, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

27. The computer program product of claim 26, wherein the measurements of performance of the application comprise at least one of:
Overall transactions per second, Average Request Time, HTTP transactions per second, Database connections used, HTTP connections used, Active thread count, Overall throughput, Database throughput, HTTP throughput.

28. A computer system embodying an application tuning tool operable to tune an application deployed in an application server, the computer system comprising:
a processor executing computer program instructions;
a memory storing the computer program instructions executed by the processor; and
the computer program instructions stored in the memory and that when executed by the processor implement:
an interface including displays of current values of application parameters and measurements of performance of the application, wherein the interface displays emphasize importance of a particular parameter over another parameter, wherein the interface comprises a first portion operable to display the current values of application parameters, and a second portion operable to display the measurements of performance of the application, wherein when the first portion changes to display values of different application parameters, the second portion continues to display the measurements of performance of the application;
software operable to receive specifications of values of application tuning parameters; and
software operable to tune the application using the received specified parameter values.

29. The application tuning tool of claim 28, wherein the application tuning tool is invoked in response to an action by an administrator, engineer, or user of the application server.

30. The application tuning tool of claim 29, wherein the first portion operable to display the current values of application parameters is further operable to accept input from the administrator, engineer, or user to specify values of the application parameters.

31. The application tuning tool of claim 30, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

32. The application tuning tool of claim 31, wherein the measurements of performance of the application comprise at least one of Overall transactions per second, Average Request Time, HTTP transactions per second, Database connections used, HTTP connections used, Active thread count, Overall throughput, Database throughput, HTTP throughput.

33. The application tuning tool of claim 29, wherein the interface comprises:
a plurality of tabs, each tab operable to display information relating to a type of parameters represented by the tab.

34. The application tuning tool of claim 33, wherein the first portion operable to display the current values of application parameters represented by a selected tab is further operable to accept input from the administrator, engineer, or user to specify values of the application parameters.

35. The application tuning tool of claim 34, wherein the values of application parameters comprise at least one of:
Database Connection Pool size, Thread Pool Size, HTTP connection pool size, HTTP incoming connection queue length, HTTP Socket timeout, Session pool size, and Java Virtual Machine tuning parameters.

36. The application tuning tool of claim 35, wherein the measurements of performance of the application comprise at least one of:
Overall transactions per second, Average Request Time, HTTP transactions per second, Database connections used, HTTP connections used, Active thread count, Overall throughput, Database throughput, HTTP throughput.

* * * * *